United States Patent [19]

Korczykowski et al.

[11] Patent Number: 4,479,873
[45] Date of Patent: Oct. 30, 1984

[54] LIGHT CONTROLLED APPARATUS FOR MOVING FILTER PRESS PLATES

[75] Inventors: Lawrence L. Korczykowski, Eden; Robert J. Zielinski, Dunkirk, both of N.Y.

[73] Assignee: The Duriron Company, Inc., Dayton, Ohio

[21] Appl. No.: 456,671

[22] Filed: Jan. 10, 1983

[51] Int. Cl.$^3$ ............................................. B01D 25/12
[52] U.S. Cl. ..................................... 210/91; 210/225; 210/230; 210/236; 100/48; 100/198
[58] Field of Search ................. 210/91, 224, 225, 230, 210/236; 100/48, 196, 197, 198, 199

[56] References Cited

U.S. PATENT DOCUMENTS

| | | | |
|---|---|---|---|
| 3,251,472 | 5/1966 | Kurita | 210/230 |
| 3,416,433 | 12/1968 | Gutnikov et al. | 100/48 |
| 4,265,749 | 5/1981 | Busse et al. | 210/138 |
| 4,289,618 | 9/1981 | Schotten et al. | 210/142 |

Primary Examiner—David Sadowski
Attorney, Agent, or Firm—Biebel, French & Nauman

[57] ABSTRACT

A filter press comprises a main frame having upper side bars for movably supporting a plurality of plates in horizontally stacked relation. The plates are moved to open the filter press by plate transporting trolleys which are supported on the upper side bars. Light emitters are mounted at one end of the press on each side bar and light detectors are mounted at the opposite end of the press on each side bar and are aligned to receive light from the light emitters. Shutters are coupled to the plate transporting trolleys such that the light from the light emitters is normally blocked by the shutters. The shutters are opened for a brief period of time when the plate transporting trolleys are moved into engagement with one of the filter plates such that plate engagement signals are generated by the light detectors. Control circuitry manages the motion of the plate transporting trolleys in response to the plate engagement signals from the light detectors such that the plates are automatically opened and the trolleys are returned to a park position. The trolleys are also initialized for the next opening operation during travel to the park position.

8 Claims, 6 Drawing Figures

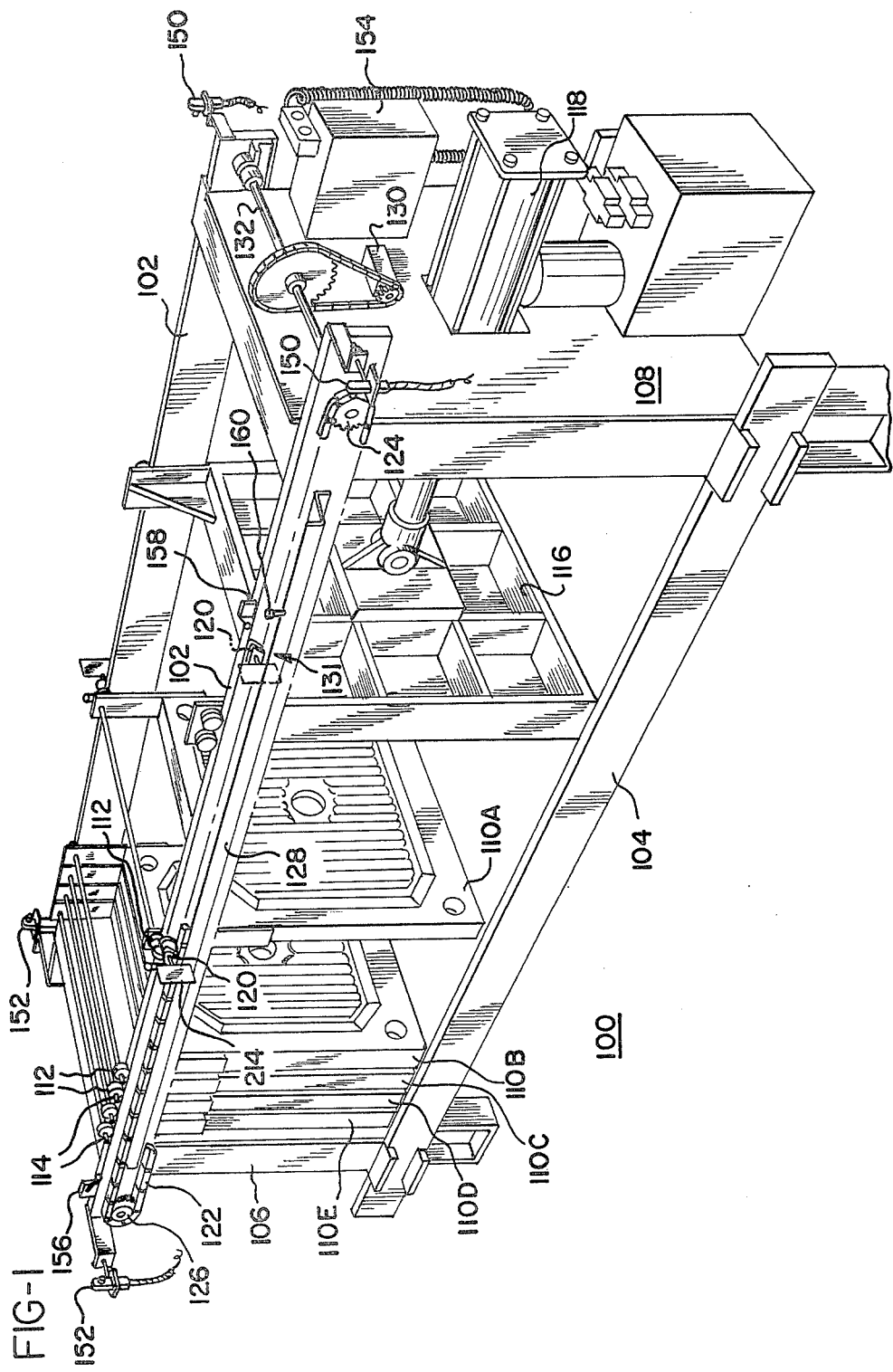

LIGHT CONTROLLED APPARATUS FOR MOVING FILTER PRESS PLATES

BACKGROUND OF THE INVENTION

The present invention relates to filter presses and, more particularly, to apparatus in a filter press for automatically moving filter plates to an open position toward a movable head plate so that the material retained within the filter press may be discharged.

Filter presses of the general type to which the present invention is applicable comprise a plurality of movable filter plates which are supported in horizontally stacked relation. The filter plates are held in place under pressure during operation of the filter press to provide a plurality of parallel connected filtering chambers. Materials which are supported within a liquid are retained within the chambers while filtered liquid is passed from the filter press. Such presses are useful in a wide spectrum of applications varying from sludge treatment and scrap recovery to food processing and wine making.

Due to the nature of the filtration performed by filter presses, the size and number of filter plates can be large with each of the filter plates being large and of considerable weight. Accordingly, mechanical apparatus is normally provided for moving the individual filter plates to an open position toward the movable head plate once the head plate has been retracted to permit opening and discharging of the filter press. Due to the size and potentially large number of the filter plates, the opening/discharging of the filter plates can be a time consuming operation and, hence, it is preferably performed automatically by the plate moving apparatus.

In accordance with one prior art arrangement disclosed in U.S. Pat. No. 3,251,472, filter plates are automatically moved toward the retracted movable head plate by means of reciprocating members which are mounted on screw shafts with the reciprocating members including pushers adapted to catch the filter plates by arms extending from either side thereof. The movement of the reciprocating members is controlled by electrical limit switches which are mounted upon the reciprocating members. While this arrangement provides automatic movement of the filter plates in a filter press, problems can be encountered due to the electrical connections which must be made with the switches which are mounted upon and move with the reciprocating members.

It is, therefore, apparent that the need exists for improved automatic filter plate moving apparatus for use in filter presses which provides automatic movement of the individual filter plates to an opened position yet does not require electrical interconnections to moving portions of the apparatus which interconnections can cause maintenance problems and failures.

SUMMARY OF THE INVENTION

The problems encountered in prior art automatic filter plate moving apparatus have been overcome in accordance with the present invention by providing plate transporting means responsive to control signals generated by light detecting means activated upon engagement of a filter plate by the plate transporting means.

The plate transporting means are supported on a press filter frame and include means for engaging individual ones of a plurality of filter plates which are also supported from the press filter frame. Light emitting means are mounted at one end of the frame and light detecting means are mounted at the opposite end of the frame and are aligned with the light emitting means to detect light emitted therefrom and to generate signals for controlling the plate transporting means in response to detected light. Shutter means are positioned between the light emitting means and the light detecting means to normally prevent passage of light therebetween with the shutter means being coupled to the plate engaging means to permit light to pass from the light emitting means to the light detecting means upon engagement of the plate engaging means with one of the plurality of filter plates.

Thus, the present invention optically couples the plate transporting means to an automatic control system such that no electrical connection is required to the moving plate transporting means. The direction of movement of the plate transporting means is determined by selectable timing and the control signals generated by the light detecting means when the shutter means is opened or moved to permit the passage of light upon engagement of the plate transporting means with individual ones of the plurality of filter plates.

In the illustrative embodiment, the transporting means comprises a first movable trolley supported on one side of the filter press frame and a second movable trolley supported on the opposite side of the frame with the shutter means being mounted to at least the first movable trolley. In the preferred embodiment of the present invention, shutter means are mounted to both the first and second movable trolleys to provide a double sensing system. This double sensing system ensures positive engagement of the plate transporting means with a filter plate prior to reversal of the direction of movement of the plate transporting means to open or move the engaged filter plate to an open position toward the retracted head plate.

Each of the filter plates of the illustrative embodiment includes first and second handles extending from opposite sides of the filter press frame and the engaging means of the plate transporting means comprises unidirectionally rotatable spurs on the movable trolleys for engaging the handles with the shutter means being coupled to the spur of at least one of the movable trolleys. The shutter means comprises at least a first paddle having a blade portion secured to a shaft portion with the shaft portion being coupled to the spur of one of the trolleys to rotate the blade portion. The blade portion of the first paddle is oriented relative to the spur on its associated trolley such that the blade portion permits passage of light between the light emitting means and the light detecting means only as the spur rotates into engagement with the corresponding handle of a filter plate.

The spurs are made unidirectionally rotatable by means of ratchet pins which permit rotation in one desired direction but engage arms of the spurs to prevent rotation in the opposite direction. To ensure that the spurs and the shutter means are properly oriented to commence the opening operation of an associated filter press, knurled means are connected to the spurs for initializing the position of the spurs by contact with fixed members connected to the filter press frame. The fixed members engage the knurled means to rotate the spurs into contact with their associated ratchet pins which defines the initial position for commencing operation of the automatic plate shifting apparatus. This initialization is performed as the trolleys are moved to a park position after all plates of the filter press have been moved to an open position toward the retracted head plate.

As previously noted, a double sensing system is preferred. Accordingly, the shutter means preferably further comprises a second paddle having a blade portion secured to a shaft portion with the shaft portion of the second paddle being coupled to the spur of the second trolley to rotate the blade portion. The blade portion of the second paddle is oriented relative to the spur on its associated trolley such that the blade portion permits passage of light between the light emitting means and light detecting means only as the spur rotates into engagement with the corresponding handle of a filter plate. Thus, two signals are generated by the light detecting means to signify that both trolleys have engaged the handles of a filter plate such that the motion of the plate transporting means can then be reversed to open or move the engaged filter plate toward the retracted head plate.

Preferably, the light emitting means comprise first and second sources of collimated infrared light mounted on opposite sides of the filter press and the light detecting means comprise first and second infrared light detectors aligned respectively to receive light from the first and second infrared sources. The use of infrared light reduces the possibility of interference from the ambient lighting of the filter press.

It is, therefore, an object of the present invention to provide improved apparatus for automatically moving filter plates in a filter press wherein the motion of plate transporting means within the apparatus is controlled by signals generated in response to light controlled by shutter means associated with the plate transporting means.

Other objects and advantages of the invention will be apparent from the following description, the accompanying drawings and the appended claims.

BRIEF DESCRIPTION OF THE DRAWINGS

FIG. 1 is a perspective view of a filter press incorporating the improved plate moving apparatus of the present invention.

DETAILED DESCRIPTION OF THE INVENTION

Figure 2A:
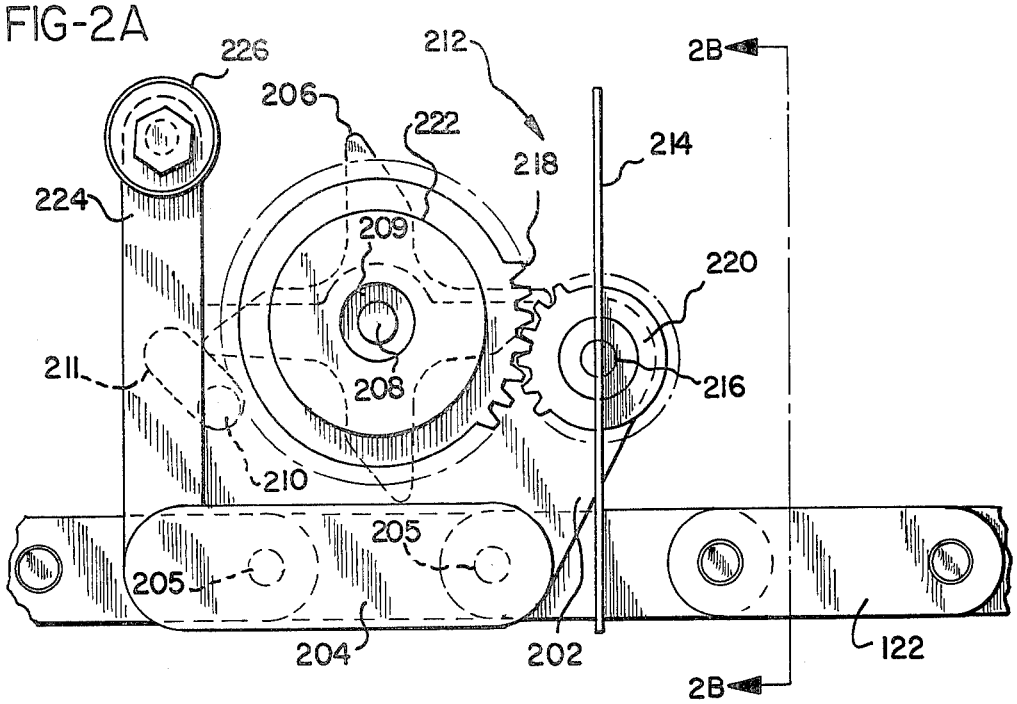
FIGS. 2A and 2B are side and front views, respectively, of the plate moving trolley for use in the present invention shown on an enlarged scale.

FIG. 1 is a perspective view of a filter press 100 incorporating the present invention. A press filter frame comprises upper side bars 102 and lower side bars 104 which extend between a fixed head plate 106 and a base plate 108. A plurality of filter plates 110A-110E are moveably supported upon the upper side bars 102 by means of rollers 112. Cylindrical handles 114 extend beyond the rollers 112 for moving the filter plates 110A-110E to an open position toward a movable head plate 116 as will be described hereinafter.

The movable head plate 116 is shown in its opened or retracted position in FIG. 1 with the position of the head plate 116 being controlled by a hydraulic ram 118. When the ram 118 is extended, the movable head plate 116 is moved to the left as shown in FIG. 1 toward the fixed head plate 106. In so moving, the ram 118 also moves any opened filter plates toward the fixed head plate 106 and ultimately closes and pressurizes the horizontal stack of movable filter plates 110A-110E between the fixed head plate 106 and the movable head plate 116. When closed and pressurized, the filter press 100 is ready to receive fluid to be filtered.

Fluid to be filtered is passed through the filter press 100 such that the chambers defined by the filter plates 110A-110E, the fixed head plate 106 and the movable head plate 116 are filled with retained particulate material. The filter press 100 must then be opened such that the particulate material contained within the chambers of the filter press can be discharged.

To open the filter press 100, the hydraulic ram 118 is retracted to move the movable head plate 116 to the opened position shown in FIG. 1. The plate moving apparatus in accordance with the present invention is then activated. The plate moving apparatus comprises plate transporting means mounted to the upper side bars 102. The plate transporting means comprise first and second movable trolleys which are supported on opposite sides of the press 100. The first and second trolleys are mirror images of each other and operate in the same manner. Accordingly, only the first trolley 120, which is fully visible in FIG. 1, will be described in detail.

The trolley 120 is mounted to a propelling chain 122 which passes around sprockets 124 and 126. The trolley 120 is supported within a channel 128 which is secured to one of the upper side bars 102. Movement of the chain 122 and, hence, the trolley 120 is controlled by a drive motor 130 which drives a shaft 132 to which the sprocket 124 is secured. The shaft 132 also drives the trolley on the opposite side of the press 100 of FIG. 1 in a similar manner.

Rotation of the drive motor 130 in a counterclockwise direction as shown in FIG. 1 rotates the drive sprocket 124 in a counterclockwise direction to propel the trolley 120 within the channel 128 toward the filter plates 110A-110E. Rotation of the motor 130 in a clockwise direction propels the trolley 120 within the channel 128 toward the movable head plate 116. It will be understood that continued counterclockwise rotation of the motor 130 after all of the filter plates 110A-110E have been moved to an open position toward the opened movable head plate 116 will move the trolley 120 around the sprocket 126, under the channel 128 and around the sprocket 124 to a rest position 131.

Figure 2B:
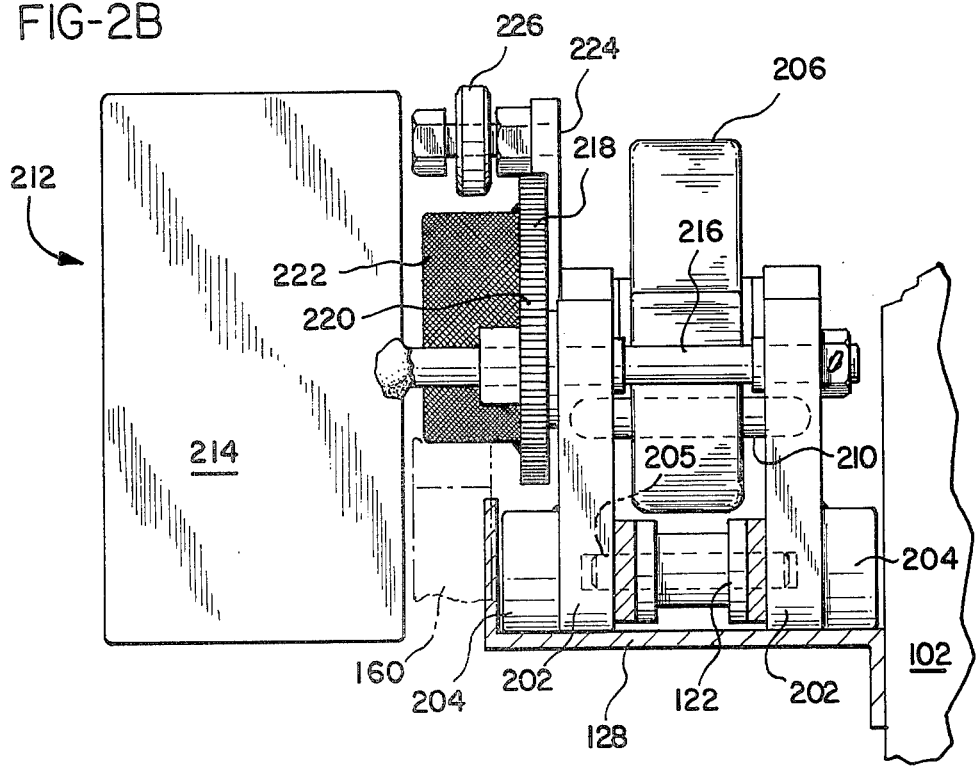

The trolley 120 is shown in detail on an enlarged scale in FIGS. 2A and 2B. The trolley 120 comprises side plates 202 which each include a generally oblong member 204 connected to the lowermost portion of the side plates 202. The oblong members 204 expand the side plates 202 such that the lower portion of the trolley 120 substantially extends between the outside wall of the upper side bar 102 and outside wall of the channel 128 to stabilize the trolley 120 as it moves within the channel 128. Holes are formed into the side plates 202 to receive pins 205 which interconnect the trolley 120 to the chain 122 as well as interconnecting the associated links of the chain 122.

A spur 206 is mounted for rotation between the two side plates 202 by means of a shaft 208 which is secured to the spur and supported by bearing surfaces 209 within both side plates 202. A ratchet pin 210 is freely suspended within inclined slots 211 formed into the inner surfaces of the side plates 202. The ratchet pin 210 permits free rotation of the spur 206 in the clockwise direction as shown in FIG. 2A but restricts rotation in the counterclockwise direction. When the trolley 120 is upright, as shown in FIGS. 2A and 2B, the ratchet pin 210 is maintained in the lower end of the slots 211 by the force of gravity such that it engages an arm of the spur 206 if the spur is rotated in the counterclockwise direction. However, if the spur 206 is rotated in a clockwise direction, a spur arm lifts the ratchet pin 210 within the slots 211 to freely pass by the pin 210 which then returns to the lower end of the slots 211 by the force of gravity.

Shutter means 212 comprises a paddle having a blade portion 214 and a shaft portion 216 which are firmly affixed to one another. The shaft 216 is mounted for rotation through the trolley side plates 202. The spur 206 and the shaft portion 216 of the paddle are engaged with one another through innermeshed gears 218 and 220. The ratio between the gears 218 and 220 is 2:1 such that for a 90° rotation of the spur 206, the shaft 216 and the connected blade 214 will rotate 180°. A cylindrical knurled member 222 is connected to the gear 218 to initialize the positioning of the spur 206 and, hence, the blade 214 prior to movement of the filter plates 110A–110E as will be described hereinafter.

A generally vertical extension 224 is attached to one of the side plates 202 and includes a freely rotatable wheel 226 mounted at its end to support the trolley 120 as it passes beneath the channel 128 to travel to the park position 131. The wheel 226 supports the trolley 120 by engaging a chain guard (not shown) which shrouds the chain 122.

Referring again to FIG. 1, collimated infrared light sources 150 are mounted on both sides of the filter press 100 at one end of the press. Infrared light detecting elements 152 are mounted on both sides of the press on the end opposite to the light sources 150 and are aligned to receive light from the light sources. It will be apparent from FIG. 1 that the light generated by the light sources 150 is normally blocked by the blade 214 of the shutter means 212. When light is permitted to pass from the light sources 150 to the light detectors 152, signals are generated by the light detectors 152 and passed to the control system 154 of the filter press to control the automatic movement or opening of the filter press plates 110A–110E.

Operation of the improved plate moving apparatus in accordance with the present invention will now be described with reference to FIGS. 3, 4 and 5. It is noted that structural details of the press and trolley have been deleted for the sake of simplicity and clarity of description. When the filter plates 110A–110E are to be separated or the filter press 100 opened to discharge accumulated particulate material, the movable head 116 is retracted by the hydraulic ram 118. The trolleys are in the park position 131 shown in phantom in FIG. 1 with the paddle 214 of the shutter means 212 in a generally vertical orientation positioned between its associated light source 150 and light detector 152 such that no signal is generated by the light detectors 152.

Upon activation of the automatic plate moving apparatus in accordance with the present invention, the motor 130 is activated to rotate the shaft 132 in the counterclockwise direction as shown in FIG. 1 to move the trolleys to the left toward the filter press plates 110A–110E. Only the trolley 120 on the visible side of the filter press 100 as shown in FIG. 1 will be described since its operation and the operation of the trolley on the opposite side of the press are the same.

Figure 3:
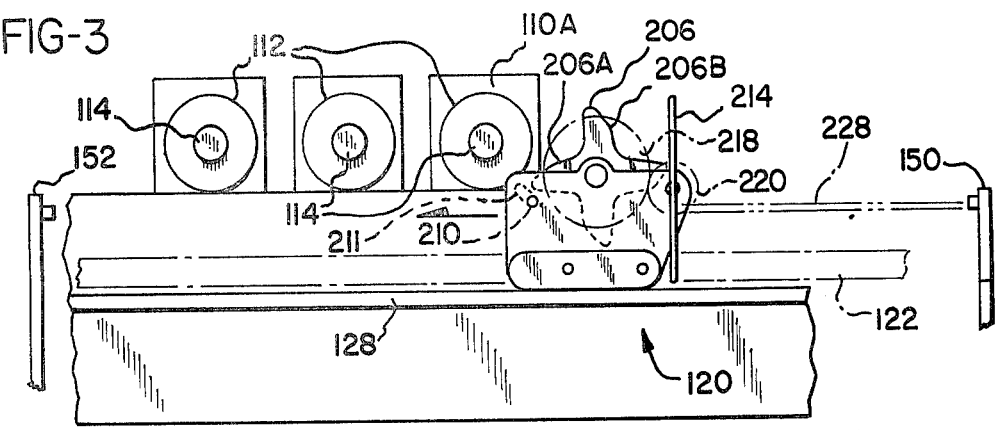
FIGS. 3 through 5 show the sequence of operation of the plate moving apparatus in accordance with the present invention.
Figure 4:
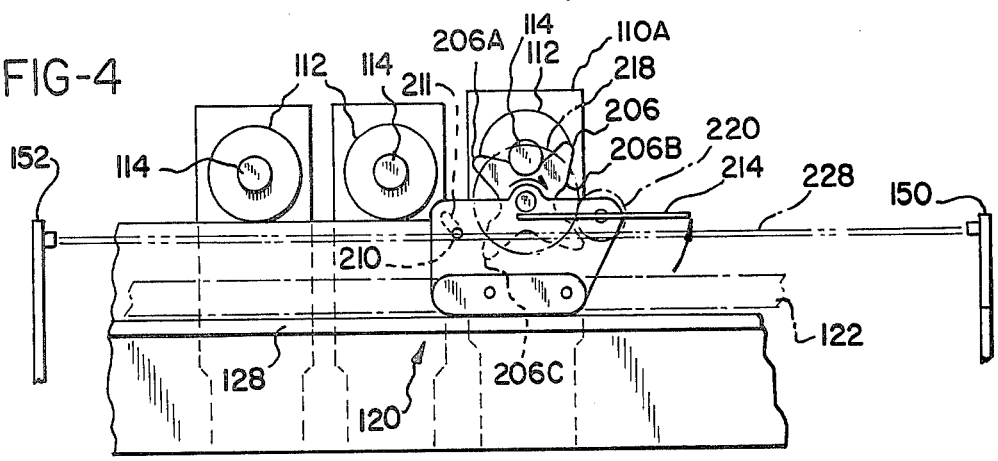

As shown in FIG. 3, the trolley 120 advances toward the filter plates 110A–110E initially encountering the filter plate 110A. The spur 206 is initially in the position to which it was set during travel to the park position 131 as will be described hereinafter. Accordingly, the forwardly extending arm 206A passes beneath the handle 114 of the filter plate 110A and the upwardly extending arm 206B contacts the handle 114 such that the spur 206 is rotated in a clockwise direction by the contact with the handle 114 as shown in FIG. 4.

Rotation of the spur 206 in turn rotates the blade 214 through the gears 218 and 220. The spur 206 and the blade 214 are synchronized to one another such that the light beam 228 from the associated light source 150 is permitted to pass to the associated light detector 152 for a brief period of time as the blade 214 passes through the generally horizontal position shown in FIG. 4. The associated light detector 152 generates a signal indicating that the trolley 120 has advanced to a position where the spur 206 is nearly engaged with the handle 114 of the next filter plate to be moved to the open position toward the movable head plate 116.

Figure 5:
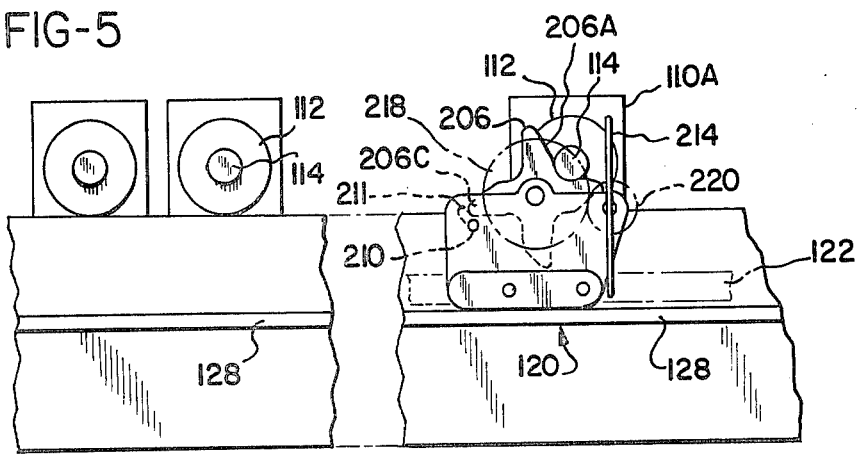

The trolley 120 will continue to move in a forward direction until the arm 206A of the spur 206 is in a generally vertical orientation and the arm 206C of the spur 206 has moved beyond the ratchet pin 210 as shown in FIG. 5. If the inertia of the trolley 120 is insufficient to carry the trolley to the fully engaged position shown in FIG. 5 after the plate engaged signal is generated by the light detector 152, a time delay is introduced into the control circuitry 154. The control circuitry 154 then delays the reversal of the direction of travel of the motor 130 for a selected time delay period after receiving a plate engaged signal from the light detector 152.

In the preferred embodiment of the present invention, engagement of both trolleys with the handles 114 of a filter plate must be signaled by the light detecting elements 152 prior to the reversal of the motor 130. For the preferred embodiment, the reversal of the motor 130 could, if necessary, be delayed for a selected time period after the last to be received of the plate engaged signals from the light detecting elements 152 if inertia does not complete the engagement of the trolleys with the next filter plate to be moved.

In any event, after engagement of both trolleys, the motor 130 is reversed to move the trolleys and the engaged filter plate, for example, the filter plate 110A as shown in FIG. 5, to an open position toward the movable head plate 116. The vertically extending arm 206A pushes the handle 114 of the engaged filter plate to roll the plate along the upper side bars 102 on the plate rollers 112.

The motor 130 is operated in the opening direction or clockwise as shown in FIG. 1 for a set period of time at a defined speed such that each plate is moved the same distance to an open position toward the movable head plate 116. After the expiration of that opening time period, the direction of operation of the motor 130 is reversed to move the trolleys toward the remaining filter plates and engage the next filter plate to be moved to the open position. The spur arm 206B will slide from beneath the handle 114 of the plate which was last moved since there is no vertical extension on the spur 206 to engage the handle 114 in the reverse or plate closing direction.

After the last filter plate 110E has been moved to an open position toward the movable head plate 116, the trolleys will move toward the fixed head plate 106 to attempt to engage the next filter plate although no filter plate remains to be moved. Upon moving to a position over the fixed head plate 106, a limit switch 156 (see FIG. 1) is tripped by the trolley 120 with the signal generated by the limit switch 156 being passed to the control circuitry 154. The signal advises the control circuitry to ignore plate engagement signals which will be subsequently generated by the light detectors 152 when the paths between the light sources 150 and light detectors 152 are cleared by the trolleys being carried below their respective channels. Hence, the motor 130 continues to operate in the counterclockwise direction to move the trolleys beneath the support channels and return them to the park position 131 shown in phantom in FIG. 1. The park position 131 is defined by a limit switch 158 which is engaged by the trolley 120 after reaching the park position 131.

As previously mentioned, the trolley 120 is supported by the roller 226 on the member 224 with the roller 226 engaging a chain guard (not shown) which surrounds the chain 122 which drives and supports the trolley 120. During the movement to the park position 131, the position of the spur 206 and the paddle blade 214 may be moved since the ratchet pin 210 is ineffective when the trolley is upside down beneath the channel 128 and the spur and blade may be bounced in either direction. Hence, each trolley must be initialized such that one arm of its spur is engaged against its ratchet pin 228 and its paddle 214 is in a generally vertical orientation to interrupt the passage of light from the associated light source 150 to the light detecting element 152.

To initialize the positioning of the spur 206 and the paddle blade 214, a fixed member 160 is connected to the channel 128 in a position to engage the knurled member 222 as the trolley 120 passes beyond the fixed member 160. The engagement between the fixed member 160 and the knurled member 222 rotates the spur 206 in the reverse direction to the maximum extent possible, i.e., until one arm of the spur 206 engages the ratchet pin 228, to define the initialized position for the trolley 120. The trolley 120 then proceeds to the park position 131 where it engages the limit switch 158 with the signal from the limit switch deactivating the motor 130 through the control circuitry 154. The limit switch 158 is positioned a sufficient distance beyond the fixed member 160 to ensure that both trolleys are initialized before the motor 130 is deactivated.

All of the filter plates 110A-110E of the filter press 100 have now been moved to an open position and the particulate material discharged from the filter chambers defined by the plates so that the filter is once again ready for filtration operation. To restore the filter press 100 to the filtering mode, the hydraulic ram 118 is activated to extend the movable head 116 toward the fixed head 106 such that the filter plates 110A-110E are firmly pressed therebetween and fluid to be filtered can once again be passed through the filter press 100.

While the form of apparatus herein described constitutes a preferred embodiment of this invention, it is to be understood that the invention is not limited to this precise form of apparatus and that changes may be made therein without departing from the scope of the invention which is defined in the appended claims.

What is claimed is:

1. In a filter press having a support frame with first and second ends and a plurality of filter plates arranged to define first and second ends and being movably mounted on said support frame between a fixed head plate at said first end of said filter plates and a movable head plate at said second end of said filter plates, apparatus for moving said plurality of filter plates comprising:

plate transporting means supported on said frame for moving said plurality of filter plates in response control signals, said transporting means including means for engaging individual ones of said plurality of filter plates;

light emitting means mounted at said first end of said frame;

light detecting means mounted at said second end of said frame opposite to said first end and being aligned with said light emitting means for detecting light emitted from said light emitting means and for generating said control signals in response to detected light emitted from said light emitting means; and shutter means positioned between said light emitting means and said light detecting means for normally preventing light from passing between said light emitting means and said light detecting means, said shutter means being coupled to said engaging means for permitting light to pass from said light emitting means to said light detecting means upon engagement of said engaging means with one of said plurality of filter plates.

2. The apparatus of claim 1 wherein said transporting means is responsive to said control signals for reversing direction of movement of said plate transporting means for a selected period of time.

3. The apparatus of claim 1 wherein said support frame has first and second sides and said transporting means comprises a first movable trolley supported on said first side of said frame and a second movable trolley supported on said second side of said frame opposite to said first side, said shutter means being mounted to at least said first movable trolley.

4. The apparatus of claim 3 wherein said plurality of filter plates each include first and second handles extending from said filter plates on opposite sides of said frame and said engaging means comprises unidirectionally rotatable spurs on said first and second movable trolleys for engaging said first and second handles, respectively, said shutter means being coupled at least to the spur of said first trolley.

5. The apparatus of claim 4 wherein said shutter means comprises at least a first paddle having a blade portion secured to a shaft portion, said shaft portion being coupled to the spur of said first trolley to rotate said blade portion which is oriented relative to the spur on said first trolley such that said blade portion permits passage of light between said light emitting means and said light detecting means only as said spur rotates in one direction into engagement with a first handle of a filter plate.

6. The apparatus of claim 5 wherein said first and second trolleys include movable ratchet pins positioned to engage said rotatable spurs such that continuous rotation of said spurs is limited to said one direction by said ratchet pins and further comprising knurled means connected to said spurs for initializing said spurs and said shutter means to an initial position, the fixed members for engaging said knurled means to rotate said spurs a limited distance to a position engaging said ratchet pins to thereby define said initial position for said spurs and said shutter means prior to movement of said plurality of filter plates.

7. The apparatus of claim 5 wherein said shutter means further comprises a second paddle having a blade portion secured to a shaft portion, said shaft portion of said second paddle being coupled to the spur of said second trolley to rotate said blade portion of said second paddle which is oriented relative to the spur on said second trolley such that said blade portion of said second paddle permits passage of light between said light emitting means and said light detecting means only as the spur of said second trolley rotates in one direction into engagement with a second handle of a filter plate.

8. The apparatus of claim 7 wherein said light emitting means comprises first and second sources of collimated infrared light positioned on each side of said frame and said light detecting means comprises first and second infrared light detectors aligned respectively with said first and second sources of collimated infrared light.

* * * * *